March 3, 1931.  J. G. WEIR  1,795,190
FEED WATER REGULATOR FOR BOILERS
Filed May 16, 1928  2 Sheets-Sheet 2

INVENTOR.
James George Weir.
By William C. Linton
Attorney.

Patented Mar. 3, 1931

1,795,190

UNITED STATES PATENT OFFICE

JAMES GEORGE WEIR, OF CATHCART, GLASGOW, SCOTLAND, ASSIGNOR TO G. & J. WEIR, LIMITED, OF GLASGOW, SCOTLAND

FEED-WATER REGULATOR FOR BOILERS

Application filed May 16, 1928, Serial No. 278,247, and in Great Britain June 20, 1927.

In modern boiler installations of high rating and small water capacity it is desirable to have a feed-water regulator which will adjust the supply of feed-water in accordance with the momentary requirements of the boiler, so that, at any instant, the supply of feed may be such as is called for by the steaming rate of the boiler at that instant and the water level in the boiler. In the case of certain regulators in common use the feed-water inlet valve is either full open or quite closed, the movement from the one position to the other being accomplished in a negligibly short space of time. This feature (full open or full closed valve) is, in the case of boilers of high rating and small water capacity, a defect of considerable moment.

It is the object of the present invention to provide a regulator having the desideratum above mentioned, that is, a regulator which acts so that at any moment the feed-water is flowing into the boiler at the rate desirable at that particular instant.

This object is accomplished according to the present invention by a boiler feed-water regulator which includes a main valve which controls the admission of feed water from the feed pump to the boiler, a float-actuated leading valve, and a chamber the pressure in which controls the movement of the main valve, the characteristic features of the invention being (1) that the leading valve controls the admission of high-pressure water— i. e. the water delivered by the feed pump to the boiler—to the said chamber, (2) that an opening movement of the main valve tends to close the leading valve and vice versa, and (3) the provision of an uncontrolled leak-off passage from the said chamber, that is, a passage which is constantly open and is not subject to any automatic control.

The following illustrative description will make the invention clear; and the invention will be plainly defined in the annexed claims.

The accompanying drawing illustrates the carrying of the invention into effect in one convenient manner.

Figure 1:
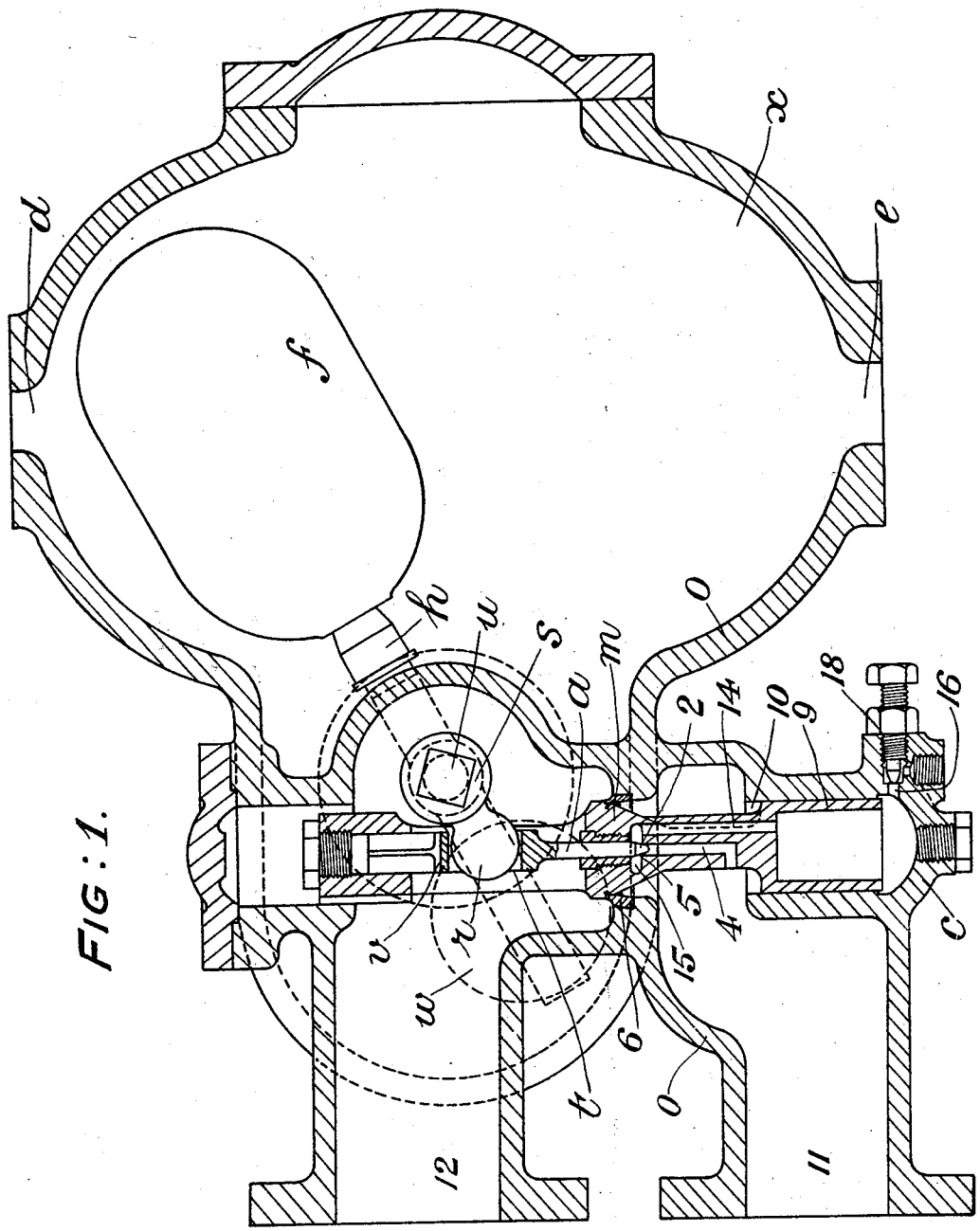
Figure 2:
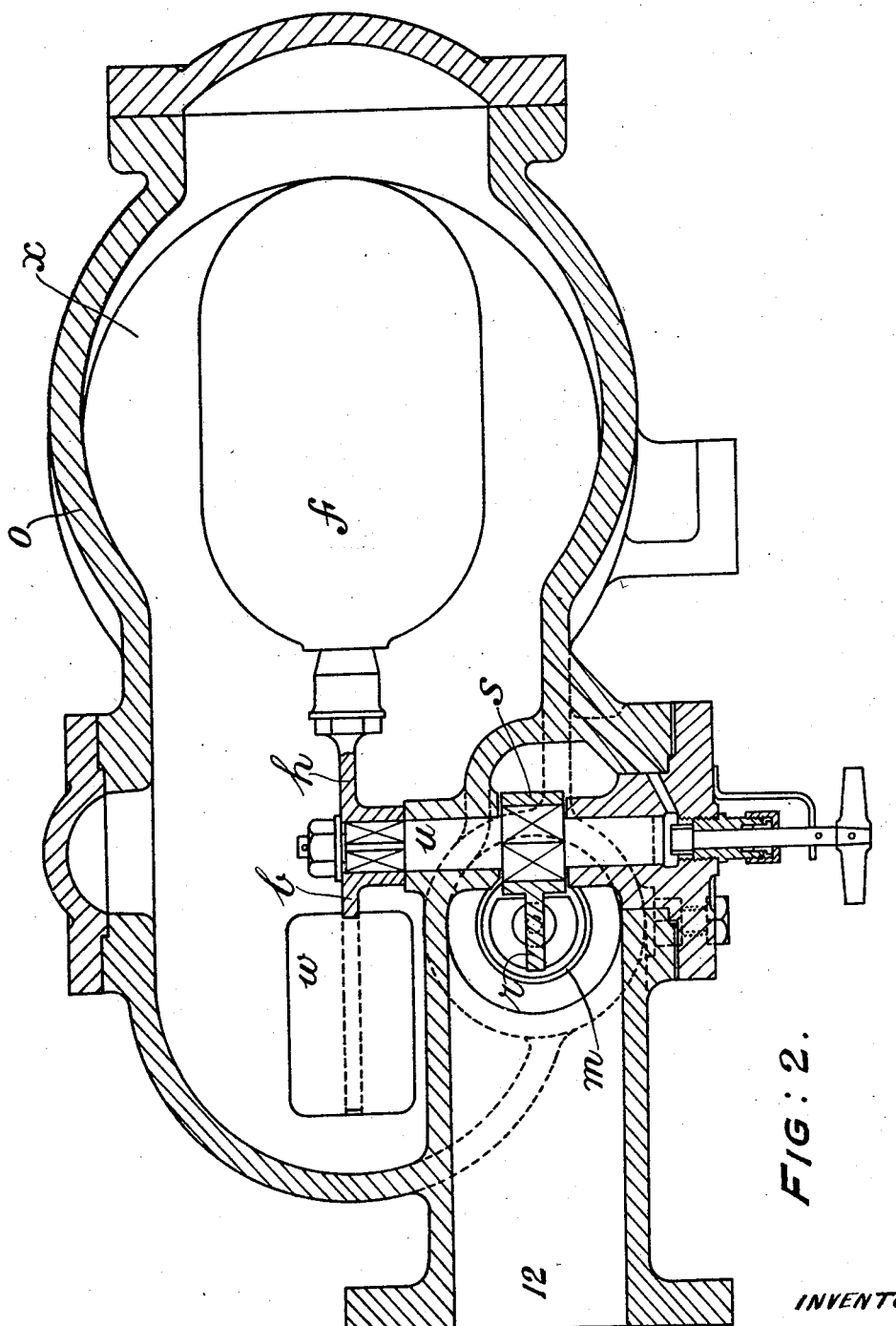

Figure 1 is a sectional elevation and Figure 2 a horizontal section of an apparatus constructed in one convenient form according to the invention.

$x$ is a chamber connected top and bottom, viz, at $d$ and $e$, with the boiler. The water level in this chamber is therefore approximately the same as in the boiler. In this chamber is a float $f$ mounted on a lever $h$ fixed on a shaft $u$ pivoted in the casting $o$ which encloses the chamber $x$. A counterweight $w$ is carried on another arm $b$ of the same lever $h$. On the shaft $u$ is also fixed a short lever $s$ having a rounded end $r$.

$a$ is the leading valve and $m$ the main valve. The rounded end $r$ of the lever $s$ is located within an opening $t$ in the head $v$ of the leading valve. The leading valve has a conical point 2 which seats at 5, that is, on the top end of a duct 4 which extends through the main valve $m$ to the chamber 15. The main valve seats on the ring or seat 6 arranged to receive it and carried in the casting $o$ which encloses the chamber $x$. The main valve at its lower end is provided with a piston 9 which is adapted to reciprocate in a cylinder 10 formed in, or attached to, the casting $o$.

11 is a port connected to the discharge of the feed pump, and 12 is a port leading to the boiler. 14 is a duct leading from the chamber 15 (the admission of water to which is controlled by the leading valve) to the chamber $c$. 16 is an uncontrolled discharge or leak-off passage from the chamber $c$ to the feed-tank. The outflow through this passage can however be regulated to suit a given set of conditions by a valve 18 which can be screwed in or out as desired to alter the extent of opening.

It will be clear that rise or fall of the float causes respectively a fall or rise of the leading valve, thus tending to decrease or increase the flow of water to the chamber c. The extent of opening of the leading valve and the (in consequence) rate of flow of water to the chamber c are also, it will be seen, affected by the position of the main valve, a rise or fall of which tends to reduce or increase (respectively) the amount of opening of the leading valve. The main valve rises or falls according to the pressure in the chamber c which, as will be clear, is dependent on the relative rates of inflow of water through the duct 14 and outflow of water through the passage 16. The inflow through the duct 14 depends on the amount of opening of the leading valve: this amount of opening is dependent on the position of both the leading valve and the main valve.

As regards the action of the apparatus— when the float f is in any given position, the leading valve occupies a corresponding position. According to the extent of admission of water to the chamber c, that is, according to the extent of opening of the leading valve, the pressure in the chamber c is such as to cause the main valve to rise or fall, or, with a certain amount of opening of the leading valve, the pressure in the chamber c is just such as to maintain the main valve in equilibrium: this may be in any position.

If the main valve is in equilibrium and if its extent of opening is such as to admit feed-water to the boiler in just sufficient quantity to balance the evaporation in the boiler, then the float f remains stationary; and, as the leading valve will then be stationary, there will be nothing to disturb the main valve and its extent of opening.

Now, suppose that the evaporation rate in the boiler increases. The float will then fall, the leading valve will rise, the pressure in the chamber c will be raised, the main valve will rise, and there will be an increased flow of feed-water into the boiler. With a falling off in the steaming rate, the action will be on analogous but reversed lines.

Having thus described my invention, what I claim as new and desire to secure by Letters Patent is:—

1. Feed water regulator for boilers comprising a main valve which acts to control the admission of feed water to the boiler, a chamber containing water under pressure, means whereby the pressure in this chamber acts to open or close the said main valve, a leak-off passage from the said chamber, a float chamber, means for maintaining the water level in this float chamber the same as in the boiler, a float in said float chamber, a leading valve, means whereby the said float controls the said leading valve in accordance with the water level in the float chamber, means for admitting high-pressure water to the first-mentioned chamber, the leading valve acting to control the said last-mentioned means, the arrangement being such that an opening movement of the said main valve tends to close the said leading valve, and a closing movement of the said main valve tends to open the said leading valve.

2. Feed-water regulator for boilers comprising a main valve which acts to control the admission of feed water to the boiler, a chamber containing water under pressure, means whereby the pressure in this chamber acts to open or close the said main valve, a leak-off passage from the said chamber, a float chamber, means for maintaining the water level in this float chamber the same as in the boiler, a float in said float chamber, a leading valve, means whereby the said float controls the said leading valve in accordance with the water level in the float chamber, a waterway through the said main valve for admitting high-pressure water to the first-mentioned chamber, the said leading valve acting to control the flow through the said waterway, the arrangement being such that an opening movement of the said main valve tends to close the said leading valve, and a closing movement of the said main valve tends to open the said leading valve.

3. Feed-water regulator for boilers comprising a main valve which acts to control the admission of feed water to the boiler, a chamber containing water under pressure, means whereby the pressure in this chamber acts to open or close the said main valve, a leak-off passage from the said chamber, a float chamber, means for maintaining the water level in this float chamber the same as in the boiler, a float in said float chamber, a leading valve, means whereby the said float controls the said leading valve in accordance with the water level in the float chamber, a waterway consisting of two ducts in series through the said main valve for admitting high-pressure water to the first-mentioned chamber, the said leading valve acting to control the flow through one of said ducts, the arrangement being such that an opening movement of the said main valve tends to close the said leading valve, and a closing movement of the said main valve tends to open the said leading valve.

4. Feed-water regulator for boilers comprising a main valve which acts to control the admission of feed water to the boiler, a chamber containing water under pressure, means whereby the pressure in this chamber acts to open or close the said main valve, a leak-off passage from the said chamber, a float chamber, means for maintaining the water level in this float chamber the same as in the boiler, a float in said float chamber, a leading valve, means whereby the said float controls the said leading valve in accordance with the water level in the float chamber, a chamber in said main valve, a duct in said main valve serving to admit high pressure water to this chamber, a second duct serving to convey water from this chamber to the first-mentioned chamber, the said leading valve acting to control the flow through the said first mentioned duct, the arrangement being such that an opening movement of the said main valve tends to close the said leading valve, and a closing movement of the said main valve tends to open the said leading valve.

I hereby sign my name to this specification.

JAMES GEORGE WEIR.